Patented June 10, 1952

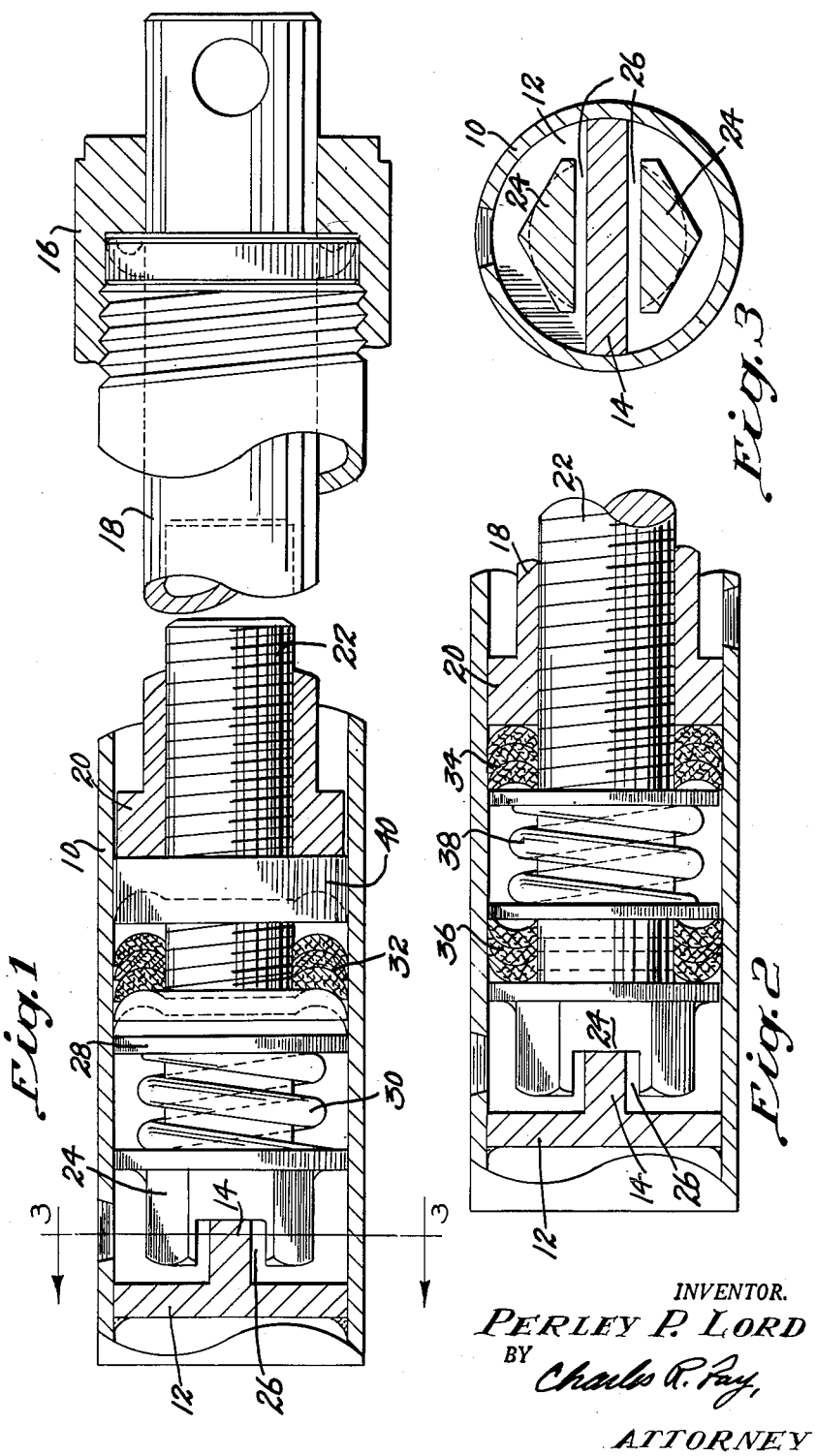

2,600,061

UNITED STATES PATENT OFFICE 2,600,061

DEVICE FOR EXPANDING PISTON PACKING

Perley P. Lord, South Lancaster, Mass.

Application December 27, 1949, Serial No. 135,092

1 Claim. (Cl. 309—34)

This invention relates to new and improved means for easily expanding piston packing in hydraulic cylinders without the necessity of removing the piston from the cylinder.

The principal object of the invention resides in the provision of a device as above stated whereby the piston packing is expanded very easily by traveling the piston to one end of the cylinder where it interlocks therewith so that the piston cannot rotate, and then rotating the piston rod, this rod having a screw threaded or other adjustable connection with the piston so that the rod is axially movable with respect to the piston and engages the packing, compressing and expanding the same against the piston or washer provided for the purpose.

Further objects of the invention include the provision of a device as above described adapted for a double action cylinder and including a slot and tongue interengagement between the piston and the cylinder and including two spaced units of expansible packing on a screw threaded shaft forming a part of the piston, there being a spring between the two units and a screw thread connection between the piston and the piston rod, so that by rotation of the latter, both packing units are expanded but, of course, the piston is still free to reciprocate in the usual manner.

Other objects and advantages of the invention will appear hereinafter.

Reference is to be had to the accompanying drawings, in which

Fig. 1 is a sectional view through a cylinder and showing the novel construction, parts being broken away;

Fig. 2 is a view similar to Fig. 1 but showing a modification; and

Fig. 3 is a section on line 3—3 of Fig. 1.

In hydraulic rams, particularly, it is necessary at times to expand the piston packing when it becomes worn or the cylinder will leak, and it has always been a time-consuming operation to remove the piston from the cylinder, adjust the packing and replace it. This invention provides a relatively simple means whereby the packing may be expanded very easily and quickly without any piston disassembly required.

As shown in Fig. 1, numeral 10 indicates a cylinder and located at one end 12 thereof there is a fixed tongue or the like 14. The other end of the cylinder is represented at 16 and may be entirely conventional. A reciprocating piston rod 18 is located in the cylinder extending through the end 16 and it terminates at its inner end in a screw-threaded portion 20 integral therewith. This screw-threaded portion is screw threadedly engaged with a threaded member 22 forming part of the piston and terminating in a member 24 having a cross slot 26 which will receive the tongue 14 when the piston is at one extreme end of its stroke as illustrated in Fig. 1.

There is provided a washer 28 which is located on the shaft 22 and between this washer and member 24 there is a relatively heavy compression spring 30. At the other side of the washer, there is located the packing 32 which is of the expansible type and is held down on washer 28 by the portion 20 of the piston rod 18.

In order to expand the packing 32 it is merely necessary to locate the piston at the end of the cylinder so that tongue 14 engages cross slot 26, by which device the piston is made nonrotatable with respect to the cylinder. Thereupon the piston rod 18 is rotated enough to advance it axially along screw threaded shaft 22, thus exerting increased pressure on the packing and causing it to expand into tighter engagement with the cylinder side walls.

A modification of this device is shown in Fig. 2, this form of the invention being particularly adapted for double action cylinders, but in this case, all the parts are the same except that there are two spaced packing units 34, 36 separated by a spring 38, similar to the spring at 30.

If desired, a washer or other type of conventional packing may be used at 40 and the end of the piston rod at 20 bears thereon in a rotational manner.

It will be seen that this invention provides a new and useful device for adjusting the tightness of piston packing in a cylinder; it is extremely simple, and simple to operate and provides that in case of looseness and leaking, the piston packing may be easily expanded to the degree desired without dismantling any parts of the piston or cylinder, and without even opening the cylinder or disturbing it in any way.

Having thus described my invention and the advantages thereof, I do not wish to be limited to the details herein disclosed, otherwise than as set forth in the claim, but what I claim is:

A hydraulic cylinder and piston device comprising a cylinder, means closing an end thereof, a tongue disposed diametrically of the cylinder interior thereof and located on said cylinder end closing means, a piston rod in the cylinder and extending outwardly thereof at the other end of the cylinder, said rod being hollow and internally threaded at its inner end, a threaded member in the cylinder and meshed with the threads on the piston rod, said member having a slot facing the closed end of the cylinder and adapted to receive the tongue to rotatively fix the threaded member, the piston rod being rotatable, means forming a piston on the threaded member, said piston comprising a washer on the threaded member and movable axially thereof, expansible packing on the threaded member, a coil spring about the threaded member, and a second washer on which the spring bears, the packing being between the washers, the normal range of reciprocation of the piston being free of the tongue, the latter and slot being engageable by manually forcing the piston past its normal limit to rotatively fix the threaded member, and the piston rod being rotatable to force the first-named washer closer to the second washer to expand the packing.

PERLEY P. LORD.

REFERENCES CITED

The following references are of record in the file of this patent:

UNITED STATES PATENTS

| Number | Name | Date |
| --- | --- | --- |
| 1,715,212 | Riggs | May 28, 1929 |
| 1,732,277 | Owens | Oct. 22, 1929 |
| 1,945,152 | Marsh | Jan. 30, 1934 |